US008800968B2

(12) United States Patent
Oscar

(10) Patent No.: US 8,800,968 B2
(45) Date of Patent: Aug. 12, 2014

(54) SYNCHRONIZING ASSEMBLY AND PLANT FOR MULTIPLE INDEPENDENT MACHINES FOR THE LAYING OF CABLES

(75) Inventor: Alberto Oscar, Castro (IT)

(73) Assignee: Tesmec Spa, Milan (IT)

( * ) Notice: Subject to any disclaimer, the term of this patent is extended or adjusted under 35 U.S.C. 154(b) by 401 days.

(21) Appl. No.: 12/809,314

(22) PCT Filed: Dec. 18, 2007

(86) PCT No.: PCT/IT2007/000880
§ 371 (c)(1),
(2), (4) Date: Jun. 18, 2010

(87) PCT Pub. No.: WO2009/078044
PCT Pub. Date: Jun. 25, 2009

(65) Prior Publication Data
US 2010/0288986 A1    Nov. 18, 2010

(51) Int. Cl.
*B66D 1/48* (2006.01)

(52) U.S. Cl.
USPC ............................ 254/267; 254/278; 254/290

(58) Field of Classification Search
USPC .......... 254/267–268, 273, 276, 278, 286, 290
See application file for complete search history.

(56) References Cited

U.S. PATENT DOCUMENTS

| | | | |
|---|---|---|---|
| 3,121,557 A * | 2/1964 | Turner | 254/134.3 R |
| 3,271,009 A * | 9/1966 | Wright et al. | 254/134.3 R |
| 3,586,293 A * | 6/1971 | Betta | 254/134.3 R |
| 5,048,797 A | 9/1991 | Theurer et al. | |
| 7,185,881 B2 * | 3/2007 | Drarvik et al. | 254/267 |
| 2005/0253125 A1 * | 11/2005 | Drarvik et al. | 254/347 |

FOREIGN PATENT DOCUMENTS

| | | | |
|---|---|---|---|
| DE | 1590205 A1 * | 2/1966 | H02G 1/04 |
| DE | 2650665 A1 * | 11/1976 | G11B 27/13 |
| EP | 0972669 | 1/2000 | |
| EP | 1282210 | 2/2003 | |
| WO | 2004/023617 | 3/2004 | |

OTHER PUBLICATIONS

International Search Report of PCT/IT2007/00880, dated Sep. 29, 2008.
Written Opinion of the International Searching Authority issued in PCT/IT2007/000880, dated Sep. 29, 2008.

* cited by examiner

*Primary Examiner* — Emmanuel M Marcelo
*Assistant Examiner* — Angela Caligiuri
(74) *Attorney, Agent, or Firm* — Hamre, Schumann, Mueller & Larson, P.C.

(57) ABSTRACT

Synchronization assembly and plant for laying cables such as electric conductors, optical fibers, ropes or suchlike. The machines of the assembly and plant are distinct and independent with respect to each other and each includes unwinding members having at least a pair of capstans to unwind the cables, and corresponding traction/collection members having at least a pair of capstans to wind the cables fed from the relative unwinding members. The synchronization assembly and plant includes automatic adjustment members that adjust the speed of rotation of the capstans of at least two unwinding members or two traction/collection members of the laying machines, so as to maintain the winding/unwinding speed of the cables stretched by each machine substantially equal.

4 Claims, 3 Drawing Sheets

SYNCHRONIZING ASSEMBLY AND PLANT FOR MULTIPLE INDEPENDENT MACHINES FOR THE LAYING OF CABLES

FIELD OF THE INVENTION

The present invention concerns a synchronization device used in machines for laying and stretching cables, such as for example electric conductors, ropes, optical fibres or suchlike, or for replacing them.

This device is applied to two or more machines suitable to lay and stretch the cables of aerial electric lines, data distribution lines, railway lines or similar.

The device according to the present invention is applied in machines each of which comprises pairs of driven capstans in order to simultaneously feed respective cables, fibres, etc., and adjustment and synchronization means able to ensure that all the cables, even fed from different machines, are constantly aligned during the laying and stretching operations.

BACKGROUND OF THE INVENTION

It is known that the operations to lay, stretch and/or replace electric cables, optical fibres, ropes or similar are usually performed using machines called winches, brakes or winch-brakes, comprising two or more combined pairs of driven capstans, made to rotate by respective hydraulic motors, so as to simultaneously lay one or more cables at once.

In a laying plant, the drawing machine (winch) determines the unwinding speed of the cables from the respective capstans, while the brake machine determines the tension thereof.

In order to lay the cables, drawing pilot ropes, or the electric cables which are already on the lines and have to be replaced, are normally used.

Due to operating necessities linked to the laying procedure, and to ensure an accurate and precise control during stretching, the cables collected simultaneously from several combined capstans of the drawing machine must have the front ends which maintain their starting alignment for the whole operation. In practice, however, it is difficult to maintain this alignment for various reasons: in fact, the cables can wind onto their respective capstans differently from each other; the capstans of the same winch can have respective different rotation speeds caused by the different hydraulic losses of the circuits which feed the hydraulic motors, or due to different mechanical friction relating to the line which is being stretched (pulleys, different heights, etc.).

In the state of the art, to solve this problem, the capstans are constrained mechanically to each other by means of at least a clamping pin and drawn by means of a common drawing rope.

In this way, the cables are obliged to constantly maintain the same speed of rotation, hence theoretically ensuring that the cables are aligned for the whole of the laying step.

Although this solution partly solves the problem of alignment, it does however create other problems; for example, if it is necessary to stop one of the capstans, the operator is obliged to interrupt the drive to all the other capstans, to unconstrain the capstans, to solve the problem which has caused the stoppage, to realign the cables, to mechanically constrain the capstans to each other again and to start laying again.

All these operations need a lot of time to carry out, and are necessary even for minimal interventions which take only a few minutes maintenance; this causes a considerable waste of time and hence of productivity in the laying operation.

In any case, the use of a common drawing rope to draw an ever increasing number of cables entails an increase in costs due mainly to the considerable mechanical drawing capacities required from the rope which, according to the number and type of cable, is bigger and bigger.

In this context it must be considered that the current increase in the demand for electric energy and/or data transmission connections entails a parallel increase in the carrying capacity of the individual lines, with a consequent increase in both the size and number of the conductor cables themselves.

We therefore have a progressive increase in the laying costs and times, due not only to the oversizing of the drawing cables but also to the necessary increase in the sizes and operating capacities of known machines used for drawing and laying. In fact, for such operations combined machines are normally used, which have to support a large number of capstans.

In order to partly obviate this disadvantage, it is known to divide the overall number of bundles of cables into multiples, using a large number of known machines and equipment, each with a limited number of capstans.

But this known solution also entails operating and applicative limits, due especially to the complexity of the known machines used which have to guarantee high operating performance, and the need to guarantee synchronized laying of the cables.

Documents U.S. Pat. No. 5,048,797 and EP-A-972.669 describe devices suitable to lay a single cable, with the cable remaining still and the laying machine moving. These documents refer to systems to synchronize the speed of the laying machine and the tension of the cable, but do not attempt to solve the problem of synchronizing the speeds of two or more cables laid simultaneously by laying machines which stay stationary with respect to the ground.

One purpose of the invention is to achieve a synchronization device for plants and machines for laying and stretching a number of cables, even a large number of cables, such as for example electric conductors, optical fibres, ropes or similar, which will allow, in a simple and effective manner, to keep the leading ends of said cables constantly aligned with each other as they simultaneously unwind from several capstans of two or more different machines, during the laying steps.

Another purpose of the present invention is to achieve a synchronization device which will allow to perform the steps of simultaneous laying of a large number of cables, substantially reducing the costs and times of intervention, yet in any case guaranteeing a good alignment of the cables.

Another purpose is to achieve a device which will allow to operate individually on each of said cables, and on the relative capstans, without having to interrupt the functioning of the entire machine and hence of the other capstans.

Another purpose is to achieve a device which will allow to command several machines to lay or collect cables with only one operator, thus substantially reducing labour costs.

The Applicant has designed and embodied the present invention to overcome said shortcoming of the state of the art and to obtain further advantages.

SUMMARY OF THE INVENTION

The present invention is set forth and characterized in the main claims, while the dependent claims describe other innovative characteristics of the invention.

The synchronization device according to the invention is applied in plants comprising two or more, advantageously a plurality of, laying machines, such as for example winches, brakes or winch-brakes, distinct and independent of each other.

Each machine comprises unwinding members comprising two pairs of capstans able to lay said cables, and a corresponding plurality of traction/collection members, each provided with a relative pair of capstans on which one or more drawing ropes are wound, so that each drawing rope is able to draw a relative cable unwound from a capstan of a corresponding laying member.

The synchronization device according to the invention comprises means to automatically adjust the unwinding speed of each individual cable, by controlling the synchronization of movement of each individual rope, so as to keep the leading ends of the cables, fed from the different machines, constantly and perfectly aligned with each other.

The adjustment means comprises at least a position detection element associated with each capstan of each individual traction/collection member.

The adjustment means also comprises a unified control unit, connected with each pair of capstans of each machine, advantageously only the capstans of the traction/collection members, and able to intervene, according to the signals arriving from said position detection elements, on the members which command and adjust the speed of rotation of the respective capstans of each individual machine.

According to a variant, a position detection element is associated with a pair of capstans of an individual machine, driven by the same drive member.

In a preferential embodiment, this detection element comprises an encoder.

In another preferential embodiment, each encoder is associated with the toothed crown of a relative capstan.

The unified control unit, as we said, is able to receive the signals relating to the instantaneous angular position of each of the capstans of each individual traction/collection member, and hence to the speed of rotation thereof, and to compare them, therefore verifying if the speeds are substantially equal or if there are variations which might lead to a dis-alignment of the leading ends of the relative cables being unwound.

In a preferential embodiment, the control unit is able to fix the value of instantaneous speed of one of the pairs of capstans of a traction/collection member as a reference, and to compare the speed of rotation of the other capstans of the other traction/collection members with said reference value. In the event that the control unit detects a difference in the speed of one of the other pairs of capstans, it is able to intervene on the drive members of said other capstans to restore equal speed to all capstans of the traction/collection members.

With the synchronization device according to the present invention it is therefore possible to intervene on every individual pair of capstans of every individual machine during the traction/collection of a relative cable, in order to restore equality of the respective winding speeds in a substantially instantaneous manner.

Moreover, the invention allows to interrupt the drive of a single pair of capstans, without necessarily having to interrupt the functioning of the machine.

Another advantage is that, since it is possible to substantially synchronize different laying machines, it is also possible to lay a plurality of cables in a synchronized manner, using a corresponding plurality of simple laying machines, without providing complex combinations of different machines.

Moreover, with the present invention each individual cable is drawn by a relative drawing rope, the size and mechanical capacities of which are not constrained by the number of cables to be drawn.

We therefore have a substantial reduction in the costs of intervention, and can intervene independently on every individual cable during the laying steps.

Furthermore, all the machines used can be controlled by a single operator, for example by means of a suitable control device that uses specific command and regulation means, for example a joystick or suchlike.

Furthermore, the machines can also be used in a separate manner, if there is a small number of cables to be stretched, and can be coupled, by means of the adjustments set by the control unit, in the required number only when the number of cables to be stretched simultaneously is very high: this gives an obvious extreme flexibility of use.

BRIEF DESCRIPTION OF THE DRAWINGS

These and other characteristics of the present invention will be apparent from the following description of a preferential form of embodiment, given as a non-restrictive example, with reference to the attached drawings wherein.

DETAILED DESCRIPTION OF A
PREFERENTIAL FORM OF EMBODIMENT OF
THE INVENTION

Figure 1:
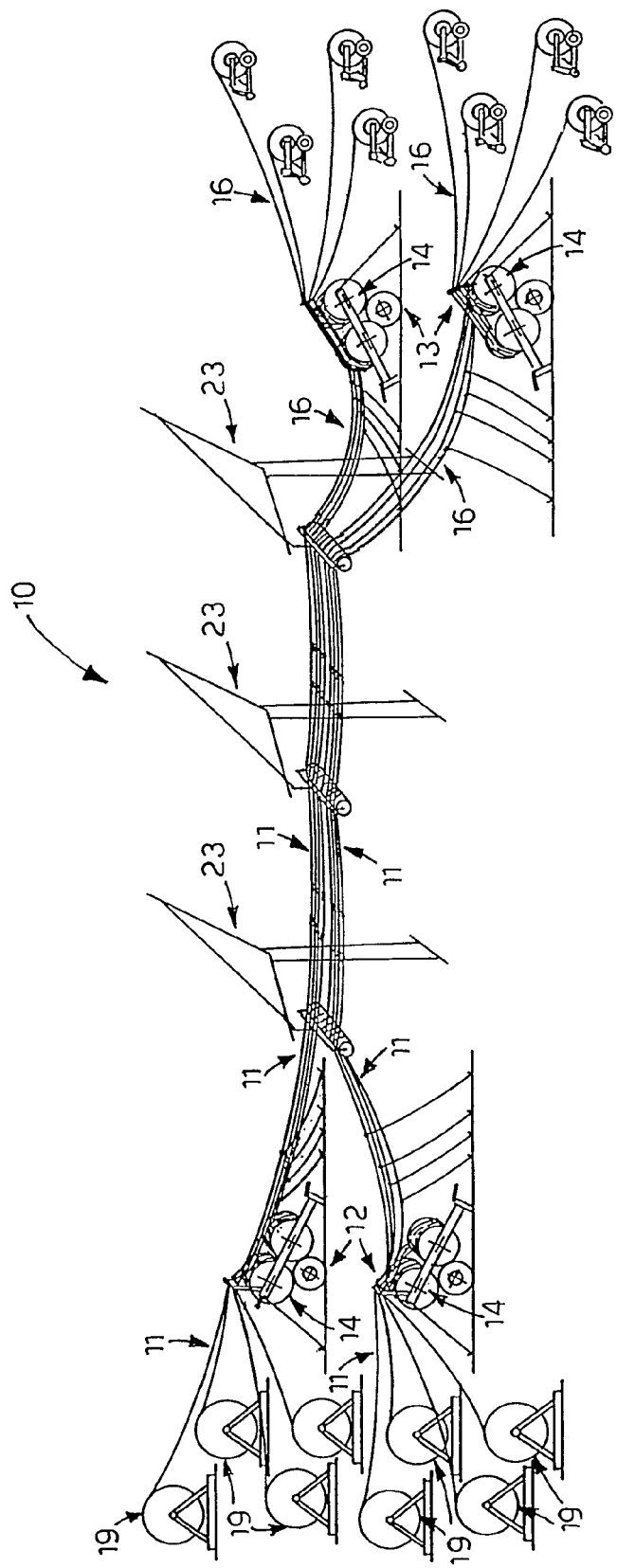
FIG. 1 shows schematically a laying plant where the synchronization device according to the present invention is applied.
Figure 2:
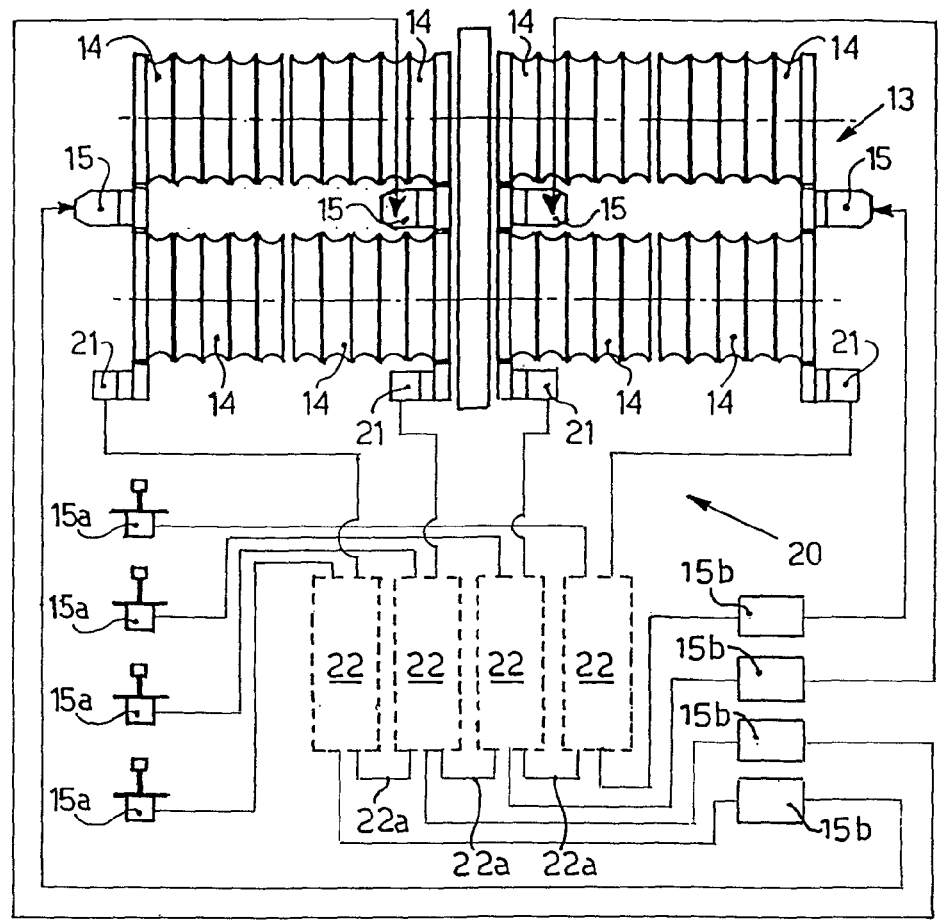
FIG. 2 shows schematically the working principle of the control and adjustment means applied to four pairs of capstans.
Figure 3:
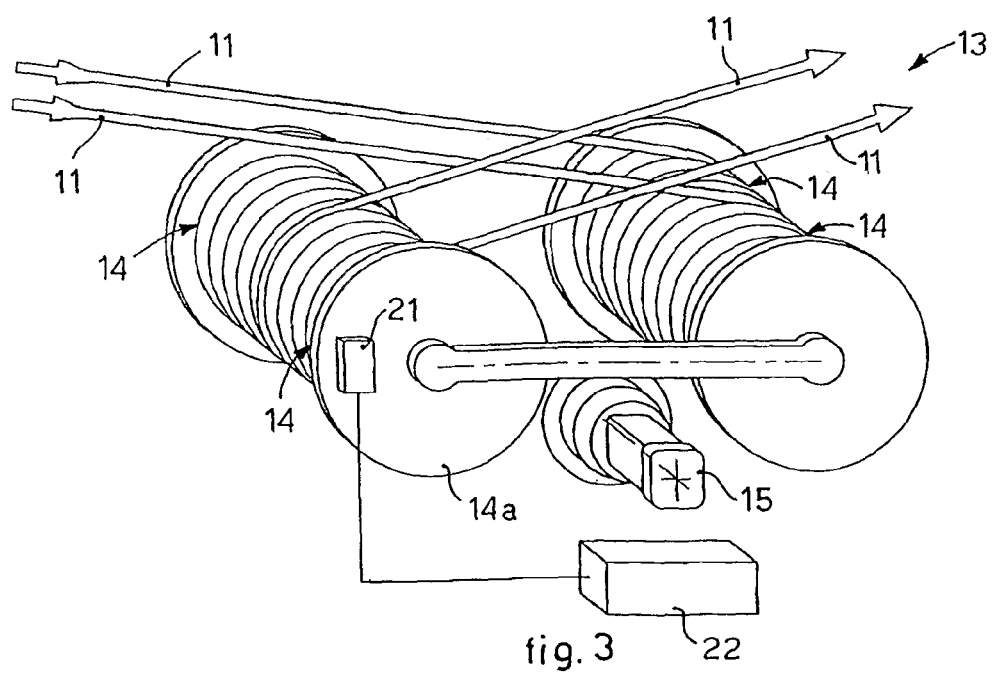
FIG. 3 is a three-dimensional view of an enlarged detail of FIG. 1.
Figure 4:
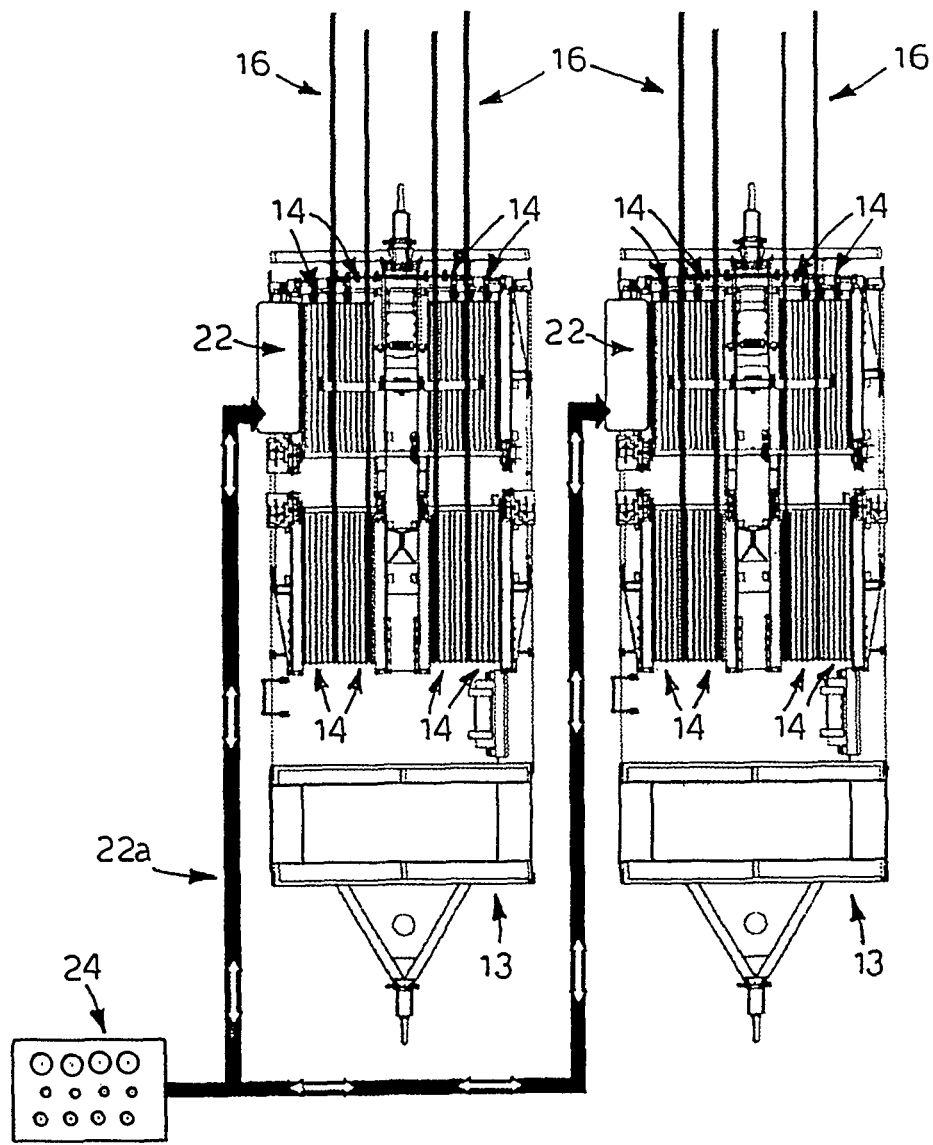
FIG. 4 shows schematically a view from above of the synchronization device in FIG. 1.

With reference to FIG. 1, a plant 10 for laying a plurality of lines of conductors 11, optical fibres, ropes or similar, according to the present invention, comprises a plurality of laying machines, in this case two, each provided with an unwinding (braking) member 12, a corresponding traction/collection member (winch) 13 and a synchronization device 20.

The unwinding members 12 and the traction/collection members 13 in this case are of the combined type able to selectively perform both the function of a winch and the function of a brake.

The unwinding members 12 and the traction/collection members 13 are positioned on opposite sides with respect to pylons 23 on which the conductors 11 are hung.

Each member 12, 13 in this case consists of a pair of capstans 14, disposed on two parallel axes, on which the conductors 11 to be laid (brake side) are able to be wound and then unwound, or on which the drawing ropes 16 of the individual conductors 11 are able to be wound (winch side).

On each unwinding member 12, the conductors 11 are fed from respective reels 19 disposed upstream of the pairs of capstans 14 of each unwinding member 12.

On each pair of capstans 14 of each traction/collection member 13, a drawing rope 16 is wound.

The drawing rope 16 of each pair of capstans 14 has one end stably connected to the end of a corresponding conductor 11 unwinding from the pair of capstans 14 of the corresponding unwinding member 12. In this way, each drawing rope 16 draws and stretches a relative conductor 11.

Each pair of capstans 14 of the traction/collection members 13 is driven by respective hydraulic motors 15, commanded by relative pumps 15b, in turn commanded by relative joysticks 15a.

It is obvious that the hydraulic motor 15 could also be electric, combustion or other types.

The synchronization device 20 is preferentially applied to all the members 13 which perform the function of traction/collection (winch), in order to synchronize the drive thereof.

Said device 20 comprises a plurality of position detection elements, for example of the encoder type 21, each one associated with a crown 14a of a relative capstan 14 for every pair, and able to detect the instantaneous angular position, and hence the speed of rotation, of every pair of capstans 14 driven by the same motor 15.

The synchronization device 20 also comprises, for each member 13, a control card 22, for each pair of independent capstans 14, connected to the relative encoder 21; the control cards 22 are connected with each other by connections 22a and the combination thereof constitutes the control unit in its entirety.

The control unit is able to compare, according to the signals supplied by the encoders 21, the speeds of rotation of all the pairs of capstans 14. The control unit 22, in its entirety, is connected at outlet, with a feedback ring, to the hydraulic circuits and feed means, for example the pump 15b, of the respective hydraulic motors 15.

Each control card 22 of each member 13 is electronically connected to the control cards 22 of the other machines of the plant 10 by the connections 22a, and all the control cards 22 are connected to a command panel 24, from which an operator performs the programming, control, rectification and verification and other necessary operations during the collection steps of the drawing ropes 16 and the relative unwinding of the conductors 11.

In the case shown in the drawings, the members 13 have four pairs of capstans 14. The present invention is also applied to members 13 provided with three, two or one pair of capstans 14. In these cases too, for every pair of capstans 14 of the same member 13 a relative control card 22 is provided, and an interconnection device for the cards 22a.

The synchronization device 20 applied to the laying plant 10 as described heretofore is used as follows.

The conductors 11, fed from the reels 19, are wound according to known techniques onto the respective capstans 14 of every individual unwinding member 12, and the leading ends of each of them are connected to the relative drawing ropes, or to the old conductors which have to be replaced, engaged on each of the traction members or winches 13.

When laying begins, said conductors 11 are levelled and stretched, making them pass through pulleys positioned at the ends of the supports of the pylons 23.

The drawing ropes 16 are wound by means of the rotation imparted by the hydraulic motors 15 to the individual capstans 14. Taking the first pair of capstans 14, for example, as a reference, the relative control card 22, being connected with the other control cards 22, compares the winding speeds of the other pairs of capstans 14 and, if any inequalities are discovered, intervenes on the respective hydraulic motors 15 so that the speeds of the capstans 14 of the individual members 13 are equivalent, possibly with a pre-set margin of tolerance.

In this way it is therefore possible to keep, instantaneously, the winding speeds of the individual capstans 14 of all the members 13 the same, and hence to keep the leading ends of the relative conductors 11 being laid constantly aligned with each other.

Moreover, in the event of break-downs or malfunctions, the invention allows to intervene on every individual capstan 14 without necessarily having to interrupt the functioning of the entire plant 10, or at least, without having to realign the conductors 11 after the maintenance intervention has been made, thus considerably reducing the times of the intervention.

It is clear, however, that modifications and/or additions of parts can be made to the device 20 as described heretofore, without departing from the field of the present invention.

For example, according to a variant, each position detection element 21 could be associated directly with the relative drawing rope 16 being wound onto the relative capstan 14 of each member 13.

It is also clear that, although the present invention has been described with reference to specific examples, a skilled person in the art shall certainly be able to achieve many other equivalent forms of synchronization device for laying cables, such as for example electric conductors, optical fibres or similar, all of which shall come within the field of the present invention.

The invention claimed is:

1. A plant for installing cables on pylons, said plant comprising:
    a plurality of machines which are distinct and independent with respect to each other, each of said machines including an unwinding member having a pair of first capstans able to unwind the cables and a corresponding collection member having a pair of second capstans able to wind the cables, said first capstans of said machines forming a first set and said second capstans of said machines forming a second set, said unwinding members and said collection members being positioned on opposite sides with respect to the pylons on which the cables are hung;
    a plurality of synchronization devices able to adjust relative speed of rotation of capstans of only one of the first and second sets of the first and second capstans of said machines, wherein a relative speed of cable-laying of said cables associated with said machines is substantially equal, each of said synchronization devices having a plurality of control cards with the control cards being connected to position detection elements associated with capstans of said only one of the first and second sets of the first and second capstans of said machines, all of the control cards of each of said machines being connected by connections to one another; and
    a control panel connected to each of said plurality of synchronization devices for an operator to control said capstans of all machines, wherein a single machine may be stopped while all others continue to operate;
    wherein an operator performs programming, control, rectification and verification operations during the unwinding of the cables associated with all of the plurality of machines.

2. The plant as in claim 1, wherein said position detection elements being able to obtain speed of rotation of said associated capstan, and wherein said control panel receives positions from said position detection elements via said control cards of all said synchronization devices and said control panel is thereby able to condition motor members of said one of the first set and the second set of each of said machines to obtain substantially equal speeds of rotation of the relative pairs of capstans.

3. The plant as in claim 2, wherein the motor members each comprise a hydraulic motor fed by a pump and controlled by a command joystick.

4. The plant as in claim 2, wherein the motor members each comprise an electric motor.

* * * * *